United States Patent [19]

Laube

[11] Patent Number: 4,653,086

[45] Date of Patent: Mar. 24, 1987

[54] COMMUNICATION TERMINAL FOR PROCESSING VOICE AND GRAPHICAL INFORMATION

[75] Inventor: Manfred Laube, Keltern, Fed. Rep. of Germany

[73] Assignee: International Standard Electric Corporation, New York, N.Y.

[21] Appl. No.: 712,303

[22] Filed: Mar. 15, 1985

[30] Foreign Application Priority Data

Mar. 15, 1984 [DE] Fed. Rep. of Germany ....... 3409532

[51] Int. Cl.$^4$ .................... H04M 11/00; H04M 1/272
[52] U.S. Cl. ........................................ 379/96; 178/19; 379/100; 379/355
[58] Field of Search ............... 179/2 DP, 2 TV, 90 B, 179/90 BB, 90 BD; 358/85; 178/19

[56] References Cited

U.S. PATENT DOCUMENTS

| | | | |
|---|---|---|---|
| 3,617,630 | 11/1971 | Reiffel | 178/19 |
| 3,732,557 | 5/1973 | Evans et al. | 179/2 DP X |
| 3,801,740 | 4/1974 | Buzzard et al. | 179/2 TV X |
| 3,912,860 | 10/1975 | Sasabe et al. | 179/2 DP X |
| 4,431,870 | 2/1984 | May et al. | 179/90 B |
| 4,456,787 | 6/1984 | Schlosser et al. | 178/19 |

FOREIGN PATENT DOCUMENTS

| | | |
|---|---|---|
| 2131316 | 7/1973 | Fed. Rep. of Germany ... 179/2 TV |
| 2433667 | 1/1976 | Fed. Rep. of Germany . | |

OTHER PUBLICATIONS

C. C. Cutler, "Displayphone: An Interactive Communication Experiment", Conference; Electronic Text Communication, Munich, Germany, Jun. 1978, pp. 323-329.
Musashino Electrical Communication Laboratory Nippon Telegraph and Telephone Public Corporation, "Telewriting Terminal 'Sketchphone'", © 1983.
Blueden et al, "Touchphone: A New Generation of Telephone Design", *Telesis*, 1985, No. 2, pp. 20-25.

*Primary Examiner*—Keith E. George
*Attorney, Agent, or Firm*—T. L. Peterson; J. S. Christopher

[57] ABSTRACT

A communication terminal for processing voice and graphical information having a telephone set including a handset supported by a housing with an input device mounted within the housing for establishing communication with a distant terminal. The input device includes a flat display screen having a presentation portion and a switching field portion. A transparent resistive coating which conducts electrical signals and which is mounted over the presentation portion is manually contacted by a pen which extracts a signal for identifying the point of contact. The pen is used to touch the portion of the screen representing a dial keypad and various switching functions. The extracted signals are digitized and transmitted to distant terminals via a control circuit which processes both voice and graphical information.

10 Claims, 5 Drawing Figures

COMMUNICATION TERMINAL FOR PROCESSING VOICE AND GRAPHICAL INFORMATION

BACKGROUND OF THE INVENTION

1. Field of the Invention

The invention relates generally to telecommunications and more particularly to a communication terminal capable of simultaneously transmitting voice and graphical representations.

2. Description of the Prior Art

In the field of voice and graphical communications, communication terminals are employed to transmit and receive voice and graphical information. In order to transmit and receive voice and graphical information, the communication terminal must be capable of processing voice communications and include a visual display unit for presenting graphical information.

In the past, such a communication terminal was disclosed in German Pat. DE-OS No. 24 33 667. This communication terminal was conventional in that a cathode-ray storage tube was employed as the display screen. The cathode-ray storage tube was intended as an attachment to a first channel in existing telephone equipment for processing voice communications. A second channel in the existing telephone equipment was employed for transmitting graphical representations. Another example of a communicaton terminal is a time work station capable of transmitting voice and graphical information via a common transmission line. Such a terminal was described in "The Electrical Communication Laboratories, NTT, Technical Publication," No. 282, June 1983. This terminal included a telephone set employed for initially establishing a connection and for processing voice communications. The terminal further included an input unit and a visual display unit for processing and displaying graphical presentations.

It is desirable to incorporate the voice communication and graphical presentation functions of a communication terminal into a single unit having a visual display unit for displaying the transmitted information. Both of the aforementioned communication terminals include a separate unit each for the voice communication function and the grpahical presentation function. Problems are associated with the construction of the prior art communication terminals. A first of these problems involves a higher technical investment requiring additional detail to coordinate separate units. A second problem is the larger space requirement for separate units while a third problem is the requirement that each separate unit be individually operated.

After consideration of the known prior art relevant to the instant invention, the aforementioned problems continue to exist.

SUMMARY OF THE PRESENT INVENTION

It is therefore an object of the present invention to provide an improved communicaton terminal having voice communication and graphical presentation functions incorporated in a single unit.

It is a further object to provide an improved communication terminal having a multi-purpose flat display screen.

It is a further object to provide an improved communication terminal having a compact design.

It is a further object to provide an improved communication terminal which is user-optimized.

Briefly, a preferred embodiment of the present invention includes a communication terminal having an external housing with a cradle and a telephone set electrically connected to the housing. The telephone set includes a handset which is supported by the cradle when not used and is employed for processing voice communications. An input device is mounted within the housing and is utilized to establish communication with at least one of a plurality of distant communication terminals. The input device includes a flat display screen having a presentation portion and a switching portion. The presentation portion is employed to display graphical an dialing information and the switching portion provides for the selection of one of a plurality of switching functions. The flat display screen includes a transparent resistive coating mounted thereon which is electrically conductive and has a plurality of electrode pairs distributed along the edges of the resistive coating which receive alternately applied voltages. A processing unit which is in electrical communication with the input device initiates the performance of the plurality of switching functions and the display and distribution of the graphical information. A circuit component connected to the resistive coating transmits the alternately applied voltages to the electrode pairs while a pen electrically connected to the circuit component and manually applied to the resistive coating of the display screen is employed to select one of the switching functions. The display screen is electrically touch sensitive with the pen extracting electrical voltage values from the resistive coating for identifying the location of the pen. A component coder receives, digitizes and transmits the extracted voltage values to the processing unit which provides a pulsed output. A control circuit controls the ditribution of the pulsed ouptut which includes an operating mode selection switch for selecting the mode of operation of the communication terminal.

Several modes of operation exist including various combinations of a telephone mode and a graphical presentation mode. The telephone mode is employed for dialing and establishing a communication link and for processing voice communications. Various switching functions are available for selection including the graphical presentation mode which permits the processing of graphical information. Upon lifting the handset, the terminal is automatically set to the telephone mode in which a dial keypad is represented on the display screen. A call number is dialed by touching the keypad. Once communication is established, the various switching functions may be selected by pen contact.

An advantage of the communication terminal of the present invention is that the voice communication and graphical presentation functions are incorporated in a single unit.

Another advantage is that the communication terminal of the present invention has a multi-purpose flat display screen.

A further advantage is that the communication terminal of the present invention has a compact design.

A further advantage is that the communication terminal of the present invention is user-optimized.

These and other objects and advantages of the present invention will no doubt become obvious to those of ordinary skill in the art after having read the following detailed description(s) of the preferred embodiment which are illustrated in the various drawing figures.

IN THE DRAWING.

DETAILED DESCRIPTION OF THE PREFERRED EMBODIMENT

Figure 1:
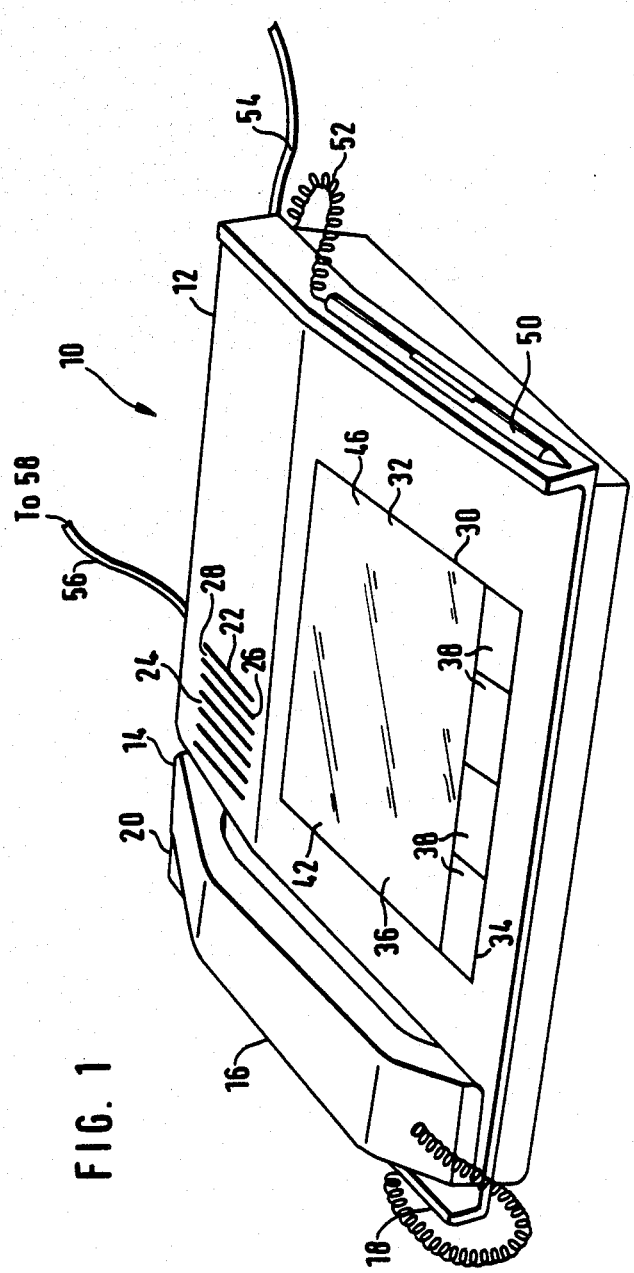
FIG. 1 is a perspective view of a communication terminal in accordance with the present invention.

FIG. 1 illustrates a communicaton terminal referred to by the general reference character 10 and incorporating the present invention. The communication terminal 10 includes a casing 12, a telephone set 14 with touch sense dialing, a handset 16 resting on a cradle 18 and on a hookswitch 20, a plurality of slots 22 within the casing 12 beneath which is a hands-free facility 24 comprises of a microphone 26 and a loudspeaker 28, an input device 30 having a flat display screen 32 with a lower longitudinal edge 34, the flat display screen 32 divided into a graphics area 36 and a plurality of switching fields 38. The switching fields 38 are further subdivided is not a plurality of partial fields 40 (shown in FIG. 5). The graphics area 36 is covered by a transparent resistive coating 42 having a plurality of electrode pairs 44. The display screen 32 further includes a plurality of row and column electrodes 46 and a plurality of screen displayed notices 48 concerning modes of operation (shown in FIG. 5). FIG. 1 further illustrates a stylus or pen 50 entering the casing 12 via a pen cable 52, a power connection cable 54 and a subscriber line 56 connecting the communication terminal 10 to a plurality of distant terminals 58 (not shown).

Figure 2:
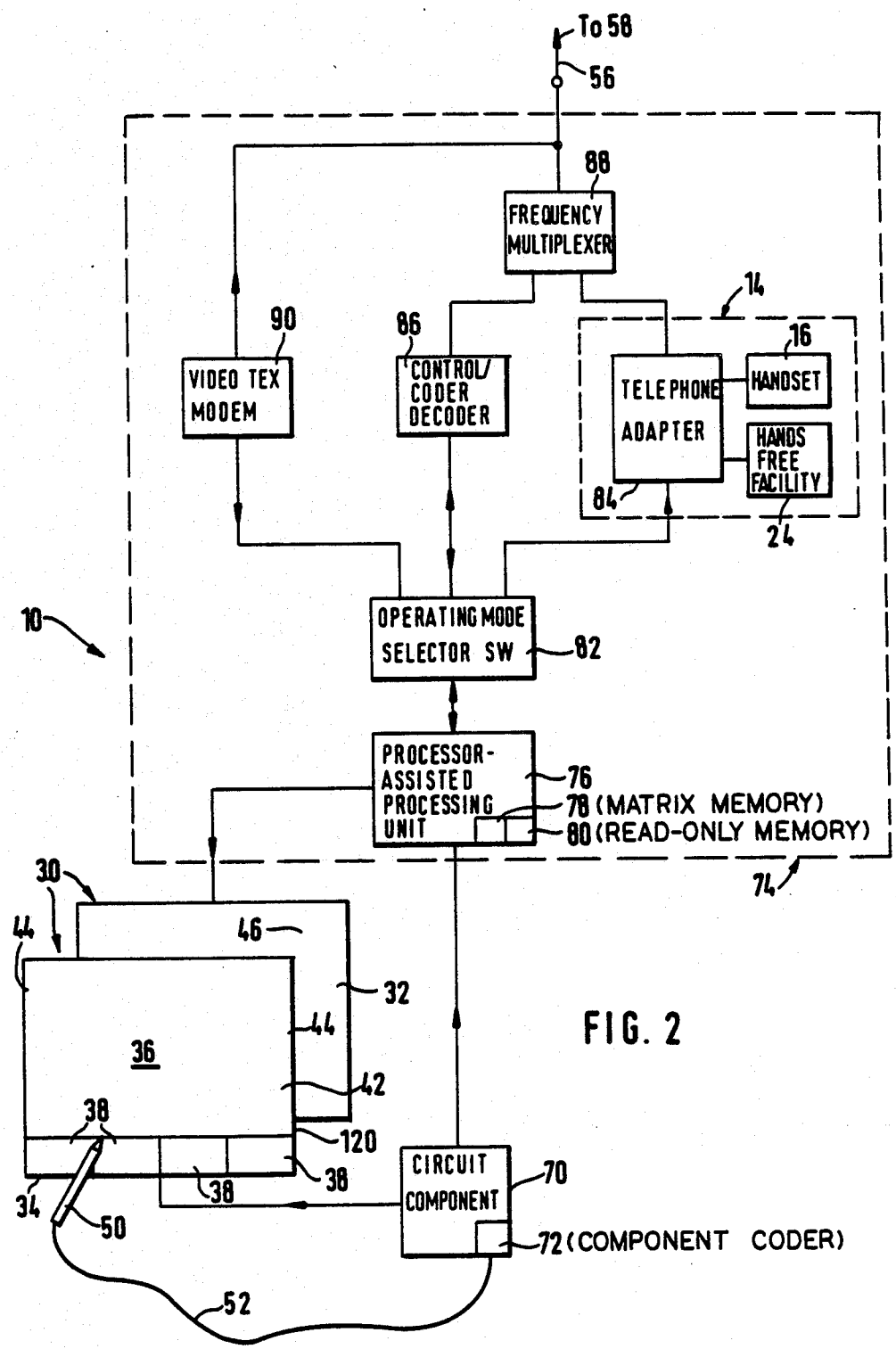
FIG. 2 is a block diagram of a control circuit of the communication terminal of FIG. 1.

FIG. 2 further illustrates a circuit component 70 which includes a component coder 72 connected to pen 50 via pen cable 52, and a control circuit 74 comprised of a processor-assisted processor unit 76 having a matrix memory 78 and a read-only memory 80. FIG. 2 also illustrates an operating mode selection switch 82, the telephone set 14 including the handset 16, the hands-free facility 24 and a telephone adapter 84, a control coder-decoder 86 and a frequency multiplexer 88 and a videotex modem 90 each connected to subscriber line 56.

Figure 3:
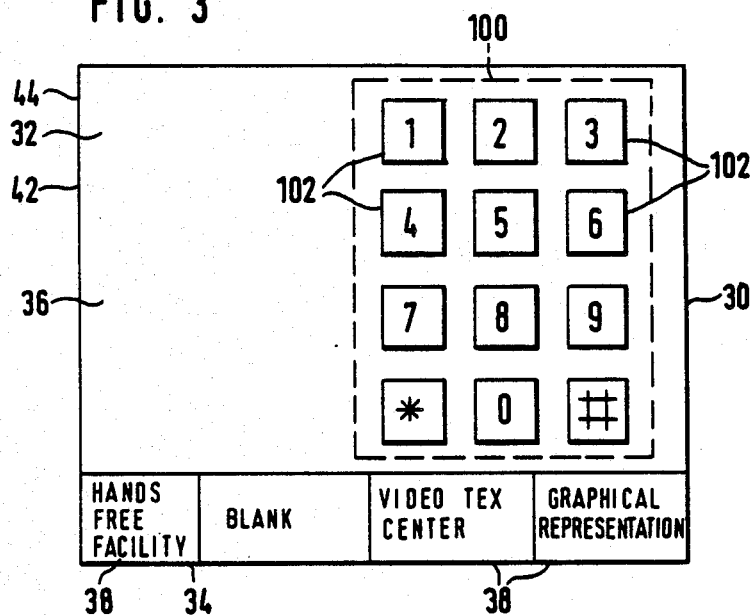
FIG. 3 is a frontal elevation of an input device of the communication terminal of FIG. 1 in a first mode of operation.

FIG. 3 further illustrates a dialing keypad 100 and a plurality of displayed keypad fields 102.

Figure 4:
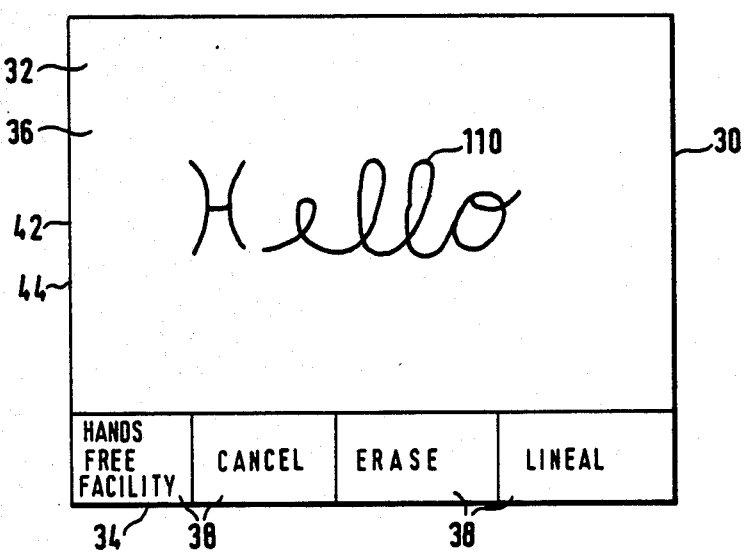
FIG. 4 is a frontal elevation of an input device of the communication terminal of FIG. 1 in a second mode of operation.
Figure 5:
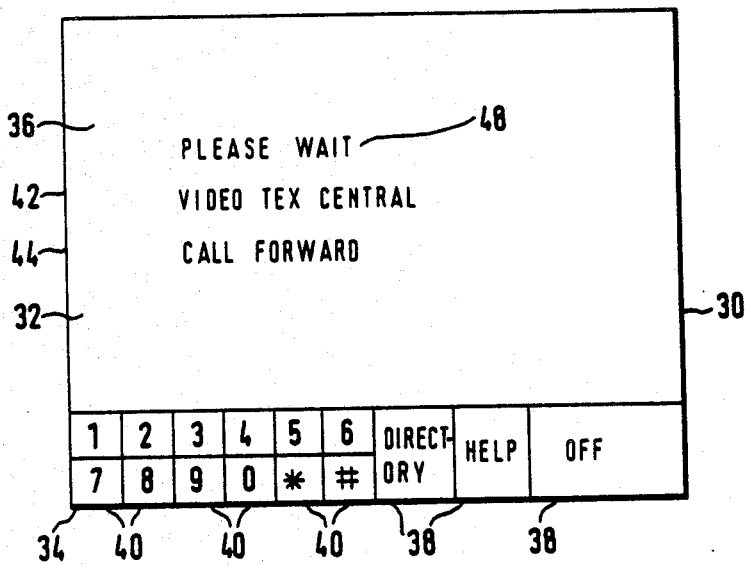
FIG. 5 is a frontal elevation of an input device of the communication terminal of FIG. 1 in a third mode of operation.

FIG. 4 illustraes one of a plurality of graphical presentations 110 while FIG. 5 illustrates the plurality of screen displayed notices 48.

FIG. 1 illustrates the compact communication terminal 10 which is a combination of the telephone set 14 with the handset 16 and the input device 30 which displays and transmits the graphical information. The communications terminal 10 is housed in the external casing 12 which is compactly designed to have a flat slope in the forward direction toward the operating side. On the left-hand side of the casing 12 there is the receiver rest or cradle 18 with the hookswitch 20 for the handset 16. In the rearward portion of the top surface of the casing 12, the plurality of slots 22 are provided. The microphone 26 and the loudspeaker 28 of the hands-free facility 24 are positioned beneath the slots 22. The hands-free facility 24 may be activated separately by switching as is shown by the block diagram of FIG. 2. The input device 30 is positioned in the flat-sloping surface of the compat casing 12 and is approximately flush therewith. The input device 30 includes the flat display screen 32 shown best in FIG. 2 and may be, for example, a liquid crystal display. Mounted on the upper surface of the flat display screen 32 is the transparent resistive coating 42. The resistive coating 42 is an electrically conductive homogenous layer which may be detachably mounted or inseparably connected to the display screen 32. Along the lower longitudinal edge 34 of the input device 20 and beyond the resistive coating 42, the plurality of four switching fields 38 are marked on the display screen 32. The four switching fields 38 are reserved for the input of switching functions whereas the graphics area 36 of the input device 30 is employed chiefly for representation of graphical information. The input device 30 contributes to the establishing of communication with one or more distant communication terminals.

A stylus or pen 50 is provided for selecting and initiating any of the switching functions of the switching fields 38 and for the input of graphical information to the display screen 32. Upon manually contacting the resistive coating 42 of the display screen 32 with the pen 50, the coordinates of the respective point of contact are intercepted in the form of voltage levels. The voltage levels are transmitted to the processing unit 76 for evaluation of coordinate location. The processing unit 76 initiates the performance of any of the selected switching functions and the representation of the graphical input on the display screen 32. The processing unit 76 further provides transmission of the graphic input via the subscriber line 56 to at least one communication terminal 58 at a distant location (not shown). The switching functions include a dialing mode and a graphical presentation mode. The flat display screen 32 is electrically touch sensitive and the purpose of extracting the voltage levels or electrical signals from the resistive coating 42 is for identifying the location of the pen 50 when applied to the resistive coating 42 for selecting one of the switching functions. The power connection cable 54 is provided for supplying electrical power to the communication terminal 10 and the pen 50 is connected to the circuit component 70 by the pen cable 52.

FIG. 2 illustrates the block diagram of the control circuit 74 of communication terminal 10 with a schematical representation of the input device 30. For the sake of clarity, the resistive coating 42 which is actually congruent with and firmly connected to the display screen 32 is shown in a somewhat staggered representation. The plurality of row and column electrodes 46 of the liquid-crystal display screen 32 are connected to the matrix memory 78 which forms an integral part of the processing unit 76. The resistive coating 42 is provided along its edges with electrodes with oppositely arranged electrodes connected in the plurality of electrode pairs 44. The electrode pairs 44 of the resistive coating 42 are electrically connected to the circuit component 70 which alternately applies voltage to the electrode pairs 44 when the communication terminal 10 is in the energized state. The component coder 72 is housed within the circuit component 70 and is electrically connected to pen 50 via pen cable 52. The transmission of information between pen 50 and component coder 72 may be accomplished by any suitable medium. Upon manually placing pen 50 upon the resistive coating 42, the pen 50 extracts the voltage levels as the alternating succession of voltage is applied to the electrode pairs 44 of resistive coating 42. The voltage levels or signals are indicative of the coordinates which define the position of the pen 50 on the resistive coating 42. The component coder 72 of the circuit component 70 receives and digitizes the extracted voltage levels and transmits the digitized signals to the processing unit 76.

The preferred embodiment is capable of performing several modes of operation. A first is a manual telephone operation mode employed for dialing and voice communications with the capability of switching to a second automatic hands-free operation mode. A third is the manual telephone operation mode with the representation and transmission of graphic information and videotex information. A fourth is the automatic hands-free operation mode with the representation and transmission of graphic information and videotex information. The operating mode selection switch 82 which is included in the control circuit 74 is employed for selecting the respective mode of operation. The telephone set 14 consists of the telephone adapter 84 in addition to the handset 16 and the hands-free facility 24. The telephone adapter 84 serves to interrupt the internal speech path during the dialing process since the telephone set 14 does not include a conventional manual dial unit. The telephone adapter 84 is connected to the operating mode selection switch 82 which permits the use of the handset 16 when the manual telephone operation mode is selected or permits the use of the hands-free facility 24 within the compact housing when the automatic hands-free operation mode is selected. The control coder-decoder 86 which is employed for editing the graphical data and the videotex modem 90 which is utilized for adjusting the frequency of the graphic information are each connected to the operating mode selection switch 82. The processor unit 76 receves the digitized signals from the circuit component 70 and provides a pulse-train output to the operating mode selection switch 82. The position of the selection switch 82 controls the distribution of the pulse-train output to the telephone adapter 84, the control coder-decoder 86 or the videotex modem 90. Note that the videotex modem 90 is directly connected to the subscriber line 56 for transmitting the graphic information; however, the telephone adapter 84 and the control coder-decoder 86 are connected to the subscriber line 56 via the frequency multiplexer which simultaneously transmits voice and graphical information within a limited bandwidth and connects the selection switch 82 to the subscriber line 56.

During the two modes of operation in which the representation and transmission of graphical information is selected, the telephone set 14 including handset 16, hands-free facility 24 and telephone adapter 84, and the control coder-decoder 86 are connected directly to the processing unit 76. After a communication link has been established via the telephone set 14, the connection of the control coder-decoder 86 to the subscriber line 56 may be accomplished either automatically by the processing unit 76 or by the input of an instruction utilizing the pen 50 manually applied to one of the switching fields represented on the display screen 32. The voltage levels which are extracted from the resistive coating 42 are recognized by the processing unit 76 are switching criteria. The dialing function is performed by the processing unit 76 and the display screen 32 since the telephone set 14 does not have a conventional manual dial unit. Therefore, the image of the dialing keypad 100 is stored in the read-only memory 80 of the processing unit 76 for dialing the telephone set 14.

FIG. 3 illustrates the input device 30 of the communication terminal 10 in the telephone mode of operation. Upon lifting the handset 16, the processing unit 76 transmits the image of the dialing keypad 100 to the matrix memory 78 of the display screen 32. The image of the dialing keypad 100 is projected onto the graphics area 36 of the display screen 32. Simultaneously, graphical statements concerning further modes of operation which are stored in the read-only memory 80 are displayed within the plurality of switching fields 38 as marked on the resistive coating 42. Accessing the communication terminal 10 in this mode causes the coordinate values of the resistive coating 42 lying within the displayed keypad fields 102 and the marked switching fields 38 to be associated with the respective numerical value within the displaced keypad fields 102 or the stated function with the marked switching fields 38. Accordingly, calling a subscriber is accomplished by touching the resistive coating 42 with the pen 50 within the area of the displayed keypad fields 102 in the succession of the call number. The processing unit 76 converts the coordinate values into corresponding trains of pulses. When the selection switch 82 is in the telephone mode of operation, the train of pulses are transmitted to the telephone adapter 84 and onward to the subscriber line 56 via the frequency multiplexer 88. The multiplexer 88 is ready to operate upon lifting the handset 16. When the image of the dialing keypad 100 is erased from the display screen 32, the desired connection has been established.

In the case of a conference call with two or more subscribers, graphical information may be transmitted if each of the subscribers switch their communication terminal 10 to the graphical representation mode of operation. This is accomplished by touching the resistive coating 42 with the pen 50 within the area of the switching fields 38 marked accordingly on the display screen 32. Because of the program sensitive assignment of all coordinate values of the switching function located within the area of the respective switching fields 38, the processing unit 76 via the selector switch 82 permits the transfer to the graphical representation mode. However, voice communication is maintained. After the establishment of this connection, the hands-free facility 24 may be selected or discontinued by touching the resistive coating 42 with the pen 50 within the area of the correspondingly marked switching field 38.

After the graphical presentation mode of operation has been selected, the statements of the switching functions in the corresponding switching fields 38 change. Except for the switch function statement for optional hands-free operation, the switching function statements are now associated with the switching fields 38 which serve to facilitate the graphical communication. In this mode of operation, the connection to the telephone set 14 for the optional on/off switching of the hands-free facility 24 is maintained and the control coder-decoder 86 is connected to the processing unit 76.

The movement of pen 50 within the graphics area 36 on the resistive coating 42 is represented in an image-dotwise manner on the display screen 32. For this purpose, the extracted coordinate values are continuously evaluated by the processing unit 76 and fed to the matrix memory 78. Data fed to the matrix memory 78 is simultaneously supplied to the control coder-decoder 86 which, apart from a modem function, has the function of providing redundancy reduction for reducing the transmission bandwidth. The frequency multiplexer 88 provides for the simultaneous transmission of voice and redundancy reduced graphical data with the redundancy reduced graphical data being transmitted via a narrow bandpass range within the bandwidth of the telephone channel.

At the distant terminal 58 a reverse ordered sequence is initiated for the recovery of the graphical data beginning with the control coder-decoder 86. The received graphical presentation 110 is fed to the matrix memory 78 via the processing unit 76. Accordingly, on the display screen 32 of one or more distant terminals 58, the transmitted graphical presentations 110 is reproduced. At this time, each of the subscribers is now able to make amendments and corrections to the graphical presentations 110 by touching one of the switching fields 38 with the pen 50 on the resistive coating 42 of any one of the distant terminals 58. The placement of the pen 50 on the resistive coating 42 at any terminal 10 or any distant terminal 58 causes the graphic input for correction to the existing graphic presentation 110 to be deactivated at all other terminals 10 and distant terminals 58. This is because corrections can be made to the graphical presentation 110 at only one terminal 10 or terminal 58 at any particular instant.

By replacing the handset 16 onto the cradle 18, the connection to all subscribers is terminated and the represented functions and setting are erased. Upon lifting the handset 16, the telephone mode is automatically initiated and the image of the dialing keypad 100 appears on the display screen 32. At this point any other mode of operation displayed on the switching fields 38 maybe selected.

The preferred embodiment also provides for receiving and transmitting videotex information. By touching the switching field 38 identified as "videotex center" (shown in FIG. 3) with the pen 50, the processing unit 76 establishes a connection to the videotex modem 90 via selection switch 82. Simultaneously, the data contents of the matrix memory 78 are erased and the plurality of screen-displayed notices 48 (shown in FIG. 5) are stored in the matrix memory 78 and displayed on the display screen 32. The videotex center is then automatically dialed by the processing unit 76. The screen-displayed notices 48 visually indicate the process that has been initiated with the visual representation being cancelled upon establishment of the connection.

As is seen in FIG. 5, the switching fields 38 in the videotex mode of operation are subdivided into partial fields 40. This subdivision is illustrated by a representation of the corresponding lines on the display screen 32. By touching the resistive coating 42 with the pen 50 within the area of the switching fields 38 and the partial fields 40, the represented switching functions are triggered so that contact may be established with the videotex center. Interruption of the existing connection is permitted by touching the switching field 38 entitled "off" (shown in FIG. 5) with the pen 50. An interrupt signal is triggered to terminate the videotex center mode. The communication terminal 10 then returns to the telephone mode of operation and the image of the dialing keypad 100 appears on the display screen 32 as shown in FIG. 3.

Thus, the present invention discloses a telephone set 14 for processing voice communications and an input device 30 for displaying graphical information which is incorporated within the single compact casing 12.

In the preferred embodiment, the extraction of the voltage levels from the resistive coating 42 to form the coordinate values is accomplished by the pend 50. In cases in which the coordinate value input is to be accomplished by an electrically neutral article, a transparent foil 120 (shown in FIG. 2) is preferably disposed at a small spacing from the resistive coating 42. The foil 120 is electrically conductively coated on the side facing the display screen 32. The foil 120 is connected to the circuit component 70. Physical contact between the foil 120 and the resistive coating 42 permits the extraction of the voltage levels locating the point of touch by the electrically neutral article. The voltage levels are then transmitted to and processed by the circuit component 70 as previously described.

Although the present invention has been described in terms of the presently preferred embodiment(s), it is to be understood that such disclosure is not to be interpreted as limiting. Various alterations and modifications will no doubt become apparent to those skilled in the art after having read the above disclosure. Accordingly, it is intended that the appended claims be interpreted as covering all alterations and modifications as fall within the true spirit and scope of the invention.

What is claimed is:

1. A communication terminal for processing voice and graphical information comprising, in combination:
an external casing having a compact design and including a cradle;
a telephone set housed within said compact casing and including a handset electrically connected to said compact casing for processing voice communications, said cradle being configured for supporting said handset;
an input device mounted within said compact casing for establishing communication with at least one of a plurality of distant communication terminals, said input device including a flat display screen having a presentation portion and a switching field portion, said presentation portion being provided for the display of graphical information and said switching field portion being provided for initiating the selection of a plurality of switching functions;
transparent resistive coating means mounted above said flat display screen, said resistive coating means being electrically conductive;
a processing unit in electrical communication with said input device for initiating the performance of said plurality of switching functions and for the display and distribution of said graphical information, said processing unit including means for displaying a dialing keypad on the presentation portion of said flat display screen enabling the dialing of said telephone set;
circuit component means in circuit relation with said transparent resistive coating means for providing coordinate value electrical signals thereto;
a pen electrically connected to said circuit component means and manually applied to said resistive coating means of said flat display screen for extracting the coordinate value electrical signals for selecting one of said plurality of switching functions, said plurality of switching functions including a dialing mode and a graphical presentation mode, said flat display screen being electrically touch sensitive and wherein said pen extracts electrical signals from said resistive coating means for identifying the location of said pen when applied to said presentation portion for inputting graphical information to said display screen in said graphical information mode and for selection of indicia on the displayed keypad for enabling dialing of said telephone set in said dialing mode;

a component coder located within said circuit component means for receiving and digitizing said extracted signals and for transmitting said digitized signals to said processing unit for providing a pulse output; and a control circuit for controlling the distribution of said pulse output including an operating mode selection switch for selecting the mode of operation fo the communication terminal wherein said telephone set processing voice communications and said input device displaying graphical information are incorporated within said compact casing.

2. The communication terminal of claim 1 wherein said control circuit further includes a telephone adapter for interrupting an internal speech path during said dialing mode, said telephone adapter being electrically connected to said handset for manual operation and to a means within said compact casing for automatic operation.

3. The communication terminal of claim 2 wherein said control circuit further includes a control coder-decoder for editing said graphical information.

4. The communication terminal of claim 3 wherein said control circuit further includes a frequency multiplexer for simultaneously transmitting voice and graphical information within a limited bandwidth and for connecting said operating mode selection switch to a subscriber line.

5. The communication terminal of claim 3 wherein said control circuit further includes a modem for transmitting said graphic information to said subscriber line.

6. The communication terminal of claim 1 wherein said transparent resistive coating means is detachably connected to said flat display screen.

7. The communication terminal of claim 1 wherein said transparent resistive coating means is inseparably connected to said flat display screen.

8. The communication terminal of claim 6 wherein said pen is connected to said circuit component means by an electric conductor.

9. The communication terminal of claim 7 wherein said pen is connected to said circuit component means by an electric conductor.

10. The communication terminal of claim 9 wherein said processing unit further includes a read-only memory having a dialing keypad stored in said read-only memory for display on the presentation portion of said flat display screen for enabling the dialing of said telephone set.

* * * * *

UNITED STATES PATENT AND TRADEMARK OFFICE
CERTIFICATE OF CORRECTION

PATENT NO. : 4,653,086

DATED : March 24, 1987

INVENTOR(S) : Manfred Laube

It is certified that error appears in the above-identified patent and that said Letters Patent is hereby corrected as shown below:

Column 1, line 47, change "grpahical" to -- graphical --.
Column 1, line 61, change "communicaton" to -- communication --.

Column 2, line 15, before "dialing" change "an" to -- and --.

Column 3, line 23, after "resting" change "on" to -- in --.
Column 3, line 25, change "comprises" to -- comprised --.
Column 3, line 30, after "subdivided" change "is not" to -- into --.
Column 3, line 55, change "illustraes" to -- illustrates --.

Column 4, line 6, change "compat" to -- compact --.

UNITED STATES PATENT AND TRADEMARK OFFICE
CERTIFICATE OF CORRECTION

PATENT NO. : 4,653,086

DATED : March 24, 1987

INVENTOR(S) : Manfred Laube

It is certified that error appears in the above-identified patent and that said Letters Patent is hereby corrected as shown below:

Column 4, line 15, change "device 20" to -- device 30 --.

Column 7, line 38, before "selected" change "maybe" to -- may be --.

Column 8, line 7, after "the" and before "50" change "pend" to -- pen --.

Signed and Sealed this

Twenty-first Day of April, 1992

Attest:

HARRY F. MANBECK, JR.

*Attesting Officer*     *Commissioner of Patents and Trademarks*